US008477641B2

(12) United States Patent
Yamazaki

(10) Patent No.: US 8,477,641 B2
(45) Date of Patent: Jul. 2, 2013

(54) RADIO COMMUNICATION SYSTEM, BASE STATION, MOBILE STATION, TIMING CONTROL DETERMINING METHOD, AND PROGRAM

(75) Inventor: Kenichirou Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 189 days.

(21) Appl. No.: 12/680,420

(22) PCT Filed: Sep. 26, 2008

(86) PCT No.: PCT/JP2008/067376
§ 371 (c)(1),
(2), (4) Date: Mar. 26, 2010

(87) PCT Pub. No.: WO2009/041547
PCT Pub. Date: Apr. 2, 2009

(65) Prior Publication Data
US 2010/0232308 A1 Sep. 16, 2010

(30) Foreign Application Priority Data

Sep. 28, 2007 (JP) ................................. 2007-254360

(51) Int. Cl.
*H04J 1/16* (2006.01)
(52) U.S. Cl.
USPC ............................ 370/252; 370/329; 455/450
(58) Field of Classification Search
USPC ................. 370/252, 322, 328, 329, 330, 338, 370/341, 347, 348; 455/450–452, 464
See application file for complete search history.

(56) References Cited

U.S. PATENT DOCUMENTS

2002/0042275 A1* 4/2002 Kitazawa et al. ............. 455/452
2003/0012143 A1* 1/2003 Chen et al. .................... 370/252
2009/0042573 A1* 2/2009 Vedantham et al. .......... 455/436

FOREIGN PATENT DOCUMENTS

JP      S62260436 A     11/1987
JP      2001333038 A    11/2001
JP      2007-096468 A    4/2007

OTHER PUBLICATIONS

International Search Report for PCT/JP2008/067376, mailed Nov. 11, 2008.
NEC, "Open issues related to timing alignment", 3GPP TSG-RAN WG#2 Meeting, #58bis, R2-072436, Jun. 2007.
NEC, "Principles of UL Synchronization Maintenance in LTE", 3GPP TSG-RAN WG2 Meeting #58, R2-071630, 2007.
NTT, DoCoMo et al., "Uplink Synchronization", 3GPP TSG RAN WG2 #57bis, R2-071300, Mar. 30, 2007.
Japanese Office Action for JP2009-534391 mailed on May 9, 2012.
Texas Instruments, Preamble Based Scheduling Request for E-UTRA, 3GPP TSG-RAN WG1 #50 R1-073422, 3GPP, Aug. 14, 2007, p. 1-p. 8.

(Continued)

Primary Examiner — Kan Yuen

(57) ABSTRACT

An uplink timing control device and method which make no excessive resource request for timing update when performing an uplink timing control even to a mobile station which performs no uplink signal transmission are provided. A system is characterized by comprising a mobile station ranking section for performing the prioritization of each mobile station from high necessity for the timing update in consideration of the occurrence of an extra-CP timing shift and the DRX remaining activation time of a mobile station which DRX-operates besides the mobile station received signal information at the time of the TA transmission in the past and the elapsed time form the TA transmission in the past. The system performs the timing update by allowing a mobile station with high priority determined by the mobile station ranking section to transmit an uplink timing detection signal and to notify the TA.

14 Claims, 10 Drawing Sheets

OTHER PUBLICATIONS

Nokia, UL Timing Accuracy and Update Rate, 3GPP TSG-RAN WG1 #47bis R1-070400, 3GPP, Jan. 10, 2007, p. 1-p. 3.
InterDigital Communications Corporation, Periodic Resource Assignment for Uplink Synchronization Transmission in LTE Active Mode, 3GPP TSG-RAN WG2 #55 R2-062803, 3GPP, Oct. 2, 2006, p. 1-p. 4.

* cited by examiner

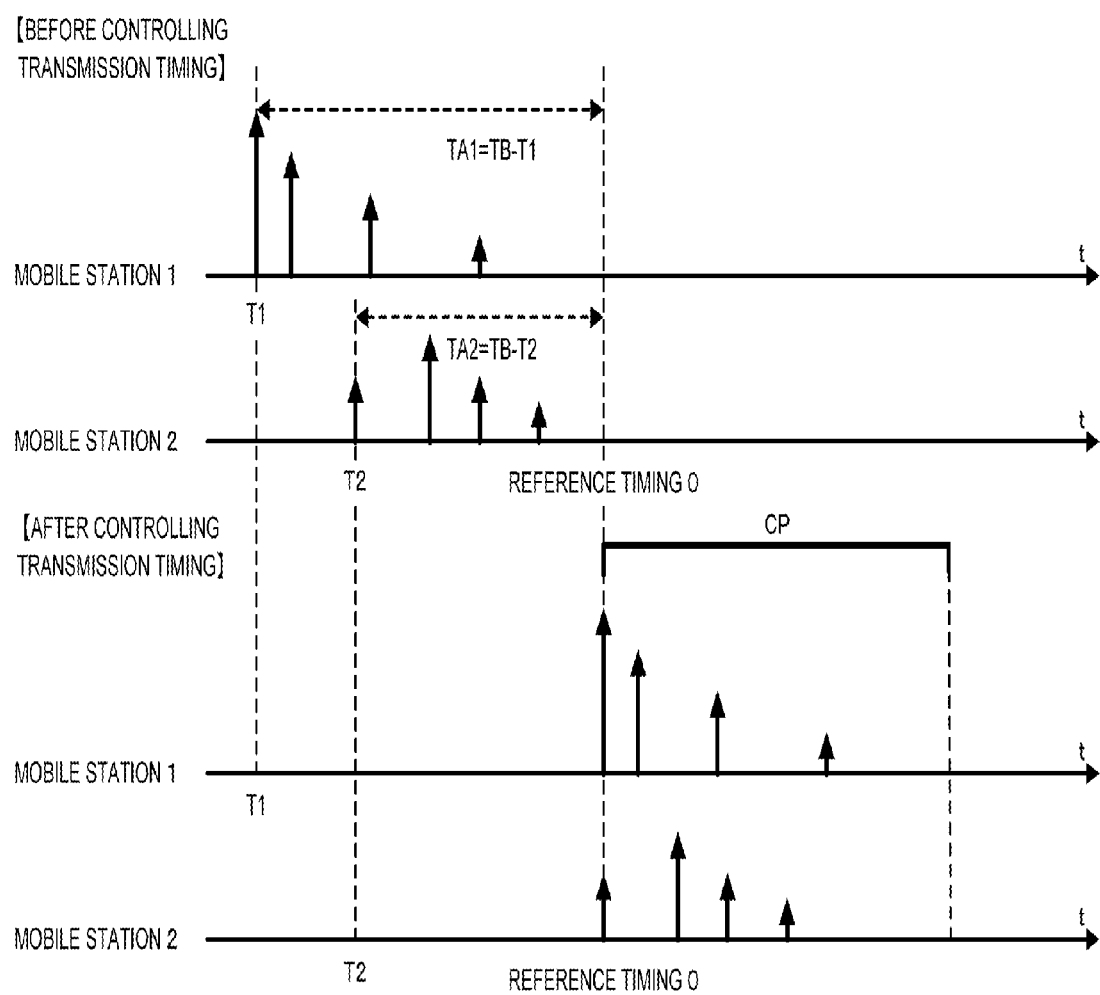

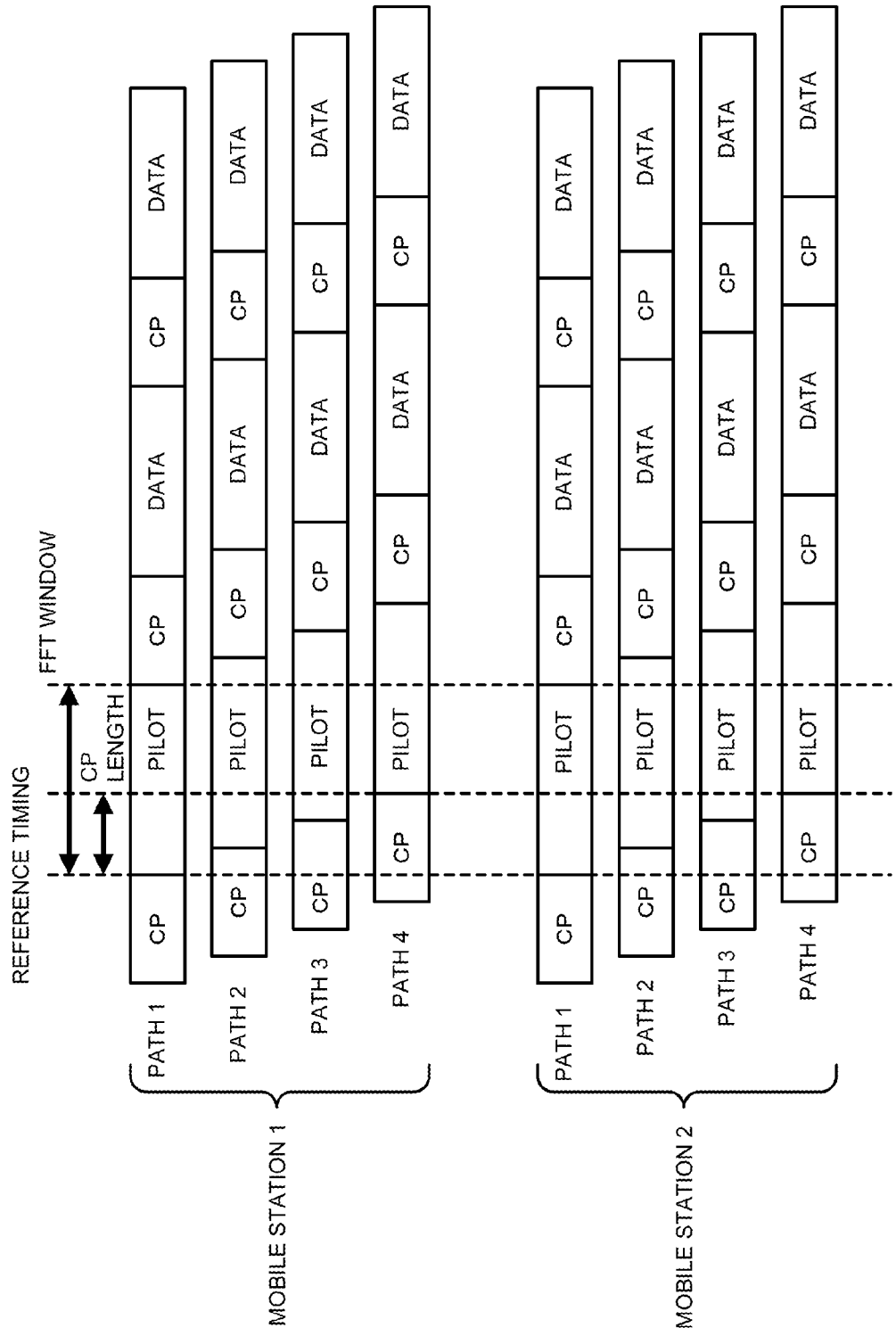

RADIO COMMUNICATION SYSTEM, BASE STATION, MOBILE STATION, TIMING CONTROL DETERMINING METHOD, AND PROGRAM

This application is the National Phase of PCT/JP2008/067376, filed on Sep. 26, 2008, which is based upon and claims the benefit of priority from Japanese patent application No. 2007-254360, filed on Sep. 28, 2007, the disclosure of which is incorporated herein in its entirety by reference.

APPLICABLE FIELD IN THE INDUSTRY

The present invention relates to a radio communication system including a base station for transmitting/receiving data to/from a plurality of mobile stations, and more particularly to a technology of determining a control of a timing of transmission to the base station from each mobile station.

BACKGROUND ART

An uplink radio system in a next-generation mobile communication is investigating an introduction of a SC-FDMA (Single-Carrier Frequency Division Multiple Access) technique having a characteristic of a low PAPR (Peak to Average Power Ratio) for a purpose of enlarging a coverage. This SC-FDMA technique is a technique of performing a single carrier transmission by utilizing each divided frequency band responding to a transmission rate necessary for a plurality of the mobile stations.

In this SC-FDMA technique, a CP (Cyclic Prefix) is added to a head of each data block so as to suppress occurrence of interference between the data blocks as shown in FIG. 6. In general, a last part of each data block is copied. A transmission side adds the CP, and a reception side removes this, thereby enabling the interference between the data blocks due to multi-path interference to be prevented from occurring.

The technique of, in the case of performing a demodulating process employing FFT (Fast Fourier Transform) with SC-FDMA technique, controlling a transmission timing of the mobile station so that a timing at which the base station receives the signal transmitted from each mobile station is accommodated within the CP, and performing an FFT operation for the transmitted signals collectively in the base station according to a reference timing has been proposed (Patent technique 1).

One example of a configuration thereof is shown in FIG. 7. This receiving apparatus of SC-FDMA signals is characterized in that one common FFT unit performs the FFT operation for the signals transmitted from all mobile stations collectively.

A CP removal unit 101 has a SC-FDMA received signal and a FFT timing as an input, and removes a portion of the received signal corresponding to GI (Guard Interval) before receipt of the FFT timing, namely, the received signal of CP (Cyclic Prefix).

An S/P converter 102 converts the received signal from which the CP has been removed from a serial signal to a parallel signal.

An FFT unit 103 performs the FFT operation for the SC-FDMA signals of all mobile stations converted to the parallel signals collectively, thereby to perform a conversion from a time domain signal to a frequency domain signal.

A de-mapping unit 104 selects one part of sub-carriers required for receiving process mobile station by mobile station from the output signal of the FFT unit 103, converts a frequency of the carrier of each mobile station to a zero frequency, and makes an adjustment to a sampling frequency according to a transmission rate.

A receiver 105-$k$ ($1 \leq k \leq K$: K is an integer equal to or more than two) is configured of a reception filter 106 and a demodulator 107.

The reception filter 106 band-limits each mobile station signal within a frequency domain, thereby to separate the mobile station signal, and to suppress noise.

A demodulator 107 is composed of an inverse diffused signal generator 108, a transmission path estimator 109, a noise suppressor 110, a weight calculation unit 111, an equalization filter 112, an IFFT unit 113, a P/S convertor 114, an IFFT unit 115, a P/S converter 116, a delay profile generator 117, and a timing detector 118.

The inverse diffused signal generator 108 has a pilot signal as an input, and generates a diffused signal being employed for estimating a transmission path in the frequency domain.

The transmission path estimator 109 has the received signal band-limited by the reception filter 106 and the inverse diffused signal generated by the inverse diffused signal generator 108 as an input, and calculates a transmission path estimated value in the frequency domain.

The noise suppressor 110 suppresses noise of the transmission path estimated value estimated by the transmission path estimator 109, and improves SNR (Signal Power to Noise Power Ratio).

The weight calculation unit 111 has the transmission path estimated value, being an output of the noise suppressor 110, as an input, and calculates a weight for an equalization filter with MMSE etc.

The equalization filter 112 has the received signal band-limited by the reception filter 106 and the equalization weight calculated by the weight calculation unit 111 as an input, and equalizes the received signal by multiplying the received signal by the equalization weight for each sub-carrier m.

The IFFT unit 113 performs an inverse-fast-Fourier-transform operation for the equalized signal in the frequency domain, being an output of the equalization filter 112, and converts it to a signal in the time domain.

The P/S converter 114 P/S-converts the equalized signal converted to the signal in the time domain, and outputs it as a demodulated signal.

On the other hand, the IFFT unit 115, the P/S converter 116, the delay profile generator 117, and the timing detector 118 detect the timings by employing the transmission path estimated value in the frequency domain outputted from the transmission path estimator 109.

The IFFT unit 115 converts the transmission path estimated value in the frequency domain to the estimated value in the time domain.

The P/S converter 116 P/S-converts the transmission path estimated value represented in the time domain.

The delay profile generator 117 calculates a power of a transmission path response sequence converted by the P/S converter 116, and generates a delay profile.

The timing detector 118 detects a forefront path with a constant level or more from the delay profile generated by the delay profile generator 117, and detects the timing of the above detected path.

Collectively performing a fast-Fourier-transform operation for the SC-FDMA received signals of all mobile stations necessitates synchronizing the timings at which the base station receives the transmitted signals coming from respective mobile stations to one another. For this purpose, the timing signal of each mobile station detected by the demodulator 107 is fed to each mobile station to control the transmission timing mobile station by mobile station.

FIG. 8 shows a block diagram of a general-purpose transmitting apparatus. A TA (Timing Advance) signal, being a difference between the timing information detected by the foregoing timing detector 118 and a reference timing being employed by the base station, is transmitted to each mobile station from the base station.

The TA signal is inputted into a modulator 201 together with other data signals being transmitted through a downlink, a control signal, a reference signal, and so on is subjected to the processes of encoding, interleave, and modulation by the modulator 201, and is outputted to a mapping unit 202.

The mapping unit 202 maps the signal outputted from the modulator 201 on a frequency axis, and output it to an IFFT unit 203.

The IFFT unit 203 performs a conversion from the frequency domain signal to the time domain signal, and outputs it.

The P/S converter 204 P/S-converts the time domain signal for which the inverse-fast-Fourier-transform operation has been performed.

A CP adder 205 adds the CP to the P/S-converted signal, and outputs it. And, a radio transmitter 206 performs the processes such as a D/A conversion, an up conversion, and a transmission power amplification for the above signal, transmits the signals for which the above processes have been executed to the mobile station from a transmitting antenna 207.

FIG. 9 shows a view illustrating an operation of a transmission timing control. Timing detectors 118 in receivers of mobile stations 1 and 2 detects timings T1 and T2 of leading paths, compares the above timings T1 and T2 with a reference timing (TB=0), and feedbacks "TB-T1" and "TB-T2" each of which is a difference between them as TA (Timing Advance) 1 and TA2 to each mobile station, respectively. Respective mobile stations take a control of delaying the transmission timings of T1 and T2 responding to values of the TA being transmitted hereto, respectively. With this operation, the interference between the mobile stations can be avoided because the reception timing of the signal transmitted from each mobile station coincides with the reference timing (TB=0) and orthogonality between the signals transmitted from respective mobile stations is maintained. Further, occurrence of the multi-path interference can avoided because all multi-paths are accommodated within the CP. FIG. 10 indicates a situation of synchronization of the signals received after controlling the transmission timing.

And, this uplink timing control is taken by employing Random Access Channel (RACH) etc. before transmitting an uplink signal. Each mobile station transmits the RACH to the base station, and the base station returns back initial timing information as a response to the RACH to each mobile station. Further, channel resources for transmitting the uplink signals (the data signal, the control signal, and the reference signal) and for transmitting the downlink signals (the data signal, the control signal, the reference signal, and the TA signal) are allocated depending upon a response to the RACH, and a response to a scheduling request.

In addition, the timing update is performed for the mobile station having performed the above-mentioned initial timing synchronization operation from a viewpoint of necessity for securing a synchronization status because a fluctuation in a timing synchronization status occurs due to a fluctuation in the transmission path situation also during the data transmission.

Patent document 1: Japanese patent application No. 2005-280091 (pp. 3-5)

DISCLOSURE OF THE INVENTION

Problems to be Solved by the Invention

In a next-generation mobile communication, a reduction in latency at the moment that the mobile station makes communication becomes one of big tasks that should be solved. For this, it is desirable that the synchronization status is established also among the mobile stations that have not transmitted the uplink signal (the mobile stations to which no uplink channel resource has been allocated). The following mobile stations exist as a mobile station that has not transmitted the uplink signal.

a mobile station that receives the downlink signal, and transmits no uplink signal.

a mobile station that performs a DRX (Discontinuous Reception) operation.

However, an uplink channel resource for transmitting the reference signal for the timing detection, which is performed by the base station, and a downlink channel resource for transmitting the TA to the mobile station from the base station cannot be allocated to all mobile stations, and the channel resources that are usable for the timing update cannot be secured by the amount equivalent to the number of all mobile stations because the number of the mobile stations, which have not transmitted the uplink signal, becomes enormous, i.e. several hundreds to several thousands upon supposing a large-capacity cellular etc. of a next generation.

For this, the effective timing update cannot be performed while the channel resource amount is limited. Further, while the interference between the mobile stations occurs in the signal received by the base station when the mobile station that causes an extra-CP timing shift to occur exists, the timing update for urgently avoiding an occurrence of the above interference cannot be performed, which arouses a problem.

An object of the present invention is to provide an uplink timing control method and device of preventing the channel resources required for the timing update from being increased, and performing the effective timing update by prioritizing (ranking) each mobile station, thereby to make a judgment as to which mobile station is subjected to the timing update while the channel resource, which is allocated to the uplink and the downlink in order to performing the timing update, is limited.

Means to Solve the Problem

The present invention for solving the above-mentioned problems, which is a radio communication system, is characterized in including: a calculating means that calculates an index for determining a priority order for controlling a transmission timing based upon timing information associated with a timing at which a signal is transmitted from each mobile station to a base station, or communication information associated with communication of each mobile station; a priority order determining means that determines the priority order based upon the foregoing calculated index; and an allocating means that allocates channel resources for communicating information, which is employed at the moment of modifying a shift of the foregoing transmission timing, to the mobile stations in a descending order of the priority, to begin with the mobile station of which the foregoing determined priority order is high.

The present invention for solving the above-mentioned problems, which is a base station, is characterized in including a calculating means that calculates an index for determining a priority order for controlling a transmission timing based upon timing information associated with a timing at which a signal is transmitted from each mobile station to its own station, or communication information associated with communication of each mobile station; a priority order determining means that determines the priority order based upon the foregoing calculated index; and an allocating means that allocates channel resources for communicating information, which is employed at the moment of modifying a shift of the foregoing transmission timing, to the mobile stations in a descending order of the priority, to begin with the mobile station of which the foregoing determined priority order is high.

The present invention for solving the above-mentioned problems, which is a mobile station, is characterized in modifying a shift of a transmission timing by employing a channel resource allocated by a base station based upon information indicative of a height of necessity for modifying a timing signal, and information that is employed at the moment of modifying the shift of the transmission timing.

The present invention for solving the above-mentioned problems, which is a method of determining a timing control, is characterized in including: a calculating step of calculating an index for determining a priority order for controlling a transmission timing based upon timing information associated with a timing at which a signal is transmitted from each mobile station to a base station, or communication information associated with communication of each mobile station; a priority order determining step of determining the priority order based upon the foregoing calculated index; and an allocating step of allocating channel resources for communicating information, which is employed at the moment of modifying a shift of the foregoing transmission timing, to the mobile stations in a descending order of the priority, to begin with the mobile station of which the foregoing determined priority order is high.

The present invention for solving the above-mentioned problems, which is a program of a base station, is characterized in causing the foregoing base station to execute: a calculating process of calculating an index for determining a priority order for controlling a transmission timing based upon timing information associated with a timing at which a signal is transmitted from each mobile station to its own station, or communication information associated with communication of each mobile station; a priority order determining process of determining the priority order based upon the foregoing calculated index; and an allocating step of allocating channel resources for communicating information, which is employed at the moment of modifying a shift of the foregoing transmission timing, to the mobile stations in a descending order of the priority, to begin with the mobile station of which the foregoing determined priority order is high.

The present invention for solving the above-mentioned problems, which is a program of a mobile station, is characterized in causing the foregoing mobile station to execute a process of modifying a shift of a transmission timing by employing a channel resource allocated by a base station based upon information indicative of a height of necessity for modifying a timing signal, and information that is employed at the moment of modifying the shift of the transmission timing.

The present invention for solving the above-mentioned problems, which is a method of controlling an uplink timing, is characterized in: prioritizing each mobile station with past TA transmission information and DRX operation information that the base station keeps defined as an evaluation condition; requesting the mobile stations to transmit the timing detection signal in a descending order of the priority, to begin with the mobile station with a high priority order; furthermore, prioritizing the mobile stations of which the reception timing shift in a received signal is out of CP in a descending order of magnitude of the interference that occurs, determining the mobile stations to which the TA is transmitted by prioritizing the mobile stations so that the mobile stations causing an extra-CP reception timing shift to occur take precedence over the mobile stations causing an intra-CP reception timing shift to occur; and transmitting the TA.

The present invention for solving the above-mentioned problems, which is a method of controlling an uplink timing, is characterized in: prioritizing the mobile stations having transmitted the timing detection signal with the TA information, the transmission path estimation information, the mobile station communication service information, and the DRX operation information defined as an evaluation condition without having the above-mentioned extra-CP mobile stations take precedence; determining the mobile stations to which the TA is transmitted in a descending order of the priority, to begin with the mobile station with a high priority order; and transmitting the TA.

The present invention for solving the above-mentioned problems, which is a method of controlling an uplink timing, is characterized in transmitting the TA to the mobile station having transmitted the timing detection signal when the number of the mobile stations to which the TA can be transmitted through the down-channel resource is equal to that of the mobile stations that can transmit the timing detection signal through the up-channel resource in accordance with another aspect of the present invention.

An Advantageous Effect of the Invention

Prioritizing each mobile station with the past TA transmission information defined as an evaluation condition together with the DRX information of the mobile station for performing the DRX operation, requesting the mobile stations to transmit the timing detection signal in a descending order of the priority, to begin with the mobile station with a high priority order; furthermore, prioritizing each mobile station according to information that is obtained from the transmitted signal of each mobile station received by the base station, and information on each mobile station that the base station previously keeps, and transmitting the TA to the mobile stations in a descending order of the priority, to begin with the mobile having a high priority order, makes it possible to perform the efficient timing update while the channel resource amount that is usable for the timing update is limited.

Further, prioritizing the mobile stations that cause the extra-CP timing shift to occur in a descending order of magnitude of the interference that occurs, ranking the mobile stations by having these mobile stations take precedence over the mobile stations that cause the intra-CP timing shift to occur; and transmitting the TA information to the mobile stations in a descending order of the priority, to begin with the mobile station having a high priority order, makes it possible to urgently avoid the interference between the mobile stations that occurs due to the timing shift, thereby allowing a reception feature to be improved.

BRIEF DESCRIPTION OF THE DRAWINGS

FIG. 9 is a view for explain an operation of a transmission timing control.

FIG. 10 is a view illustrating a situation of a synchronization of the received packet signals.

Figure 1:
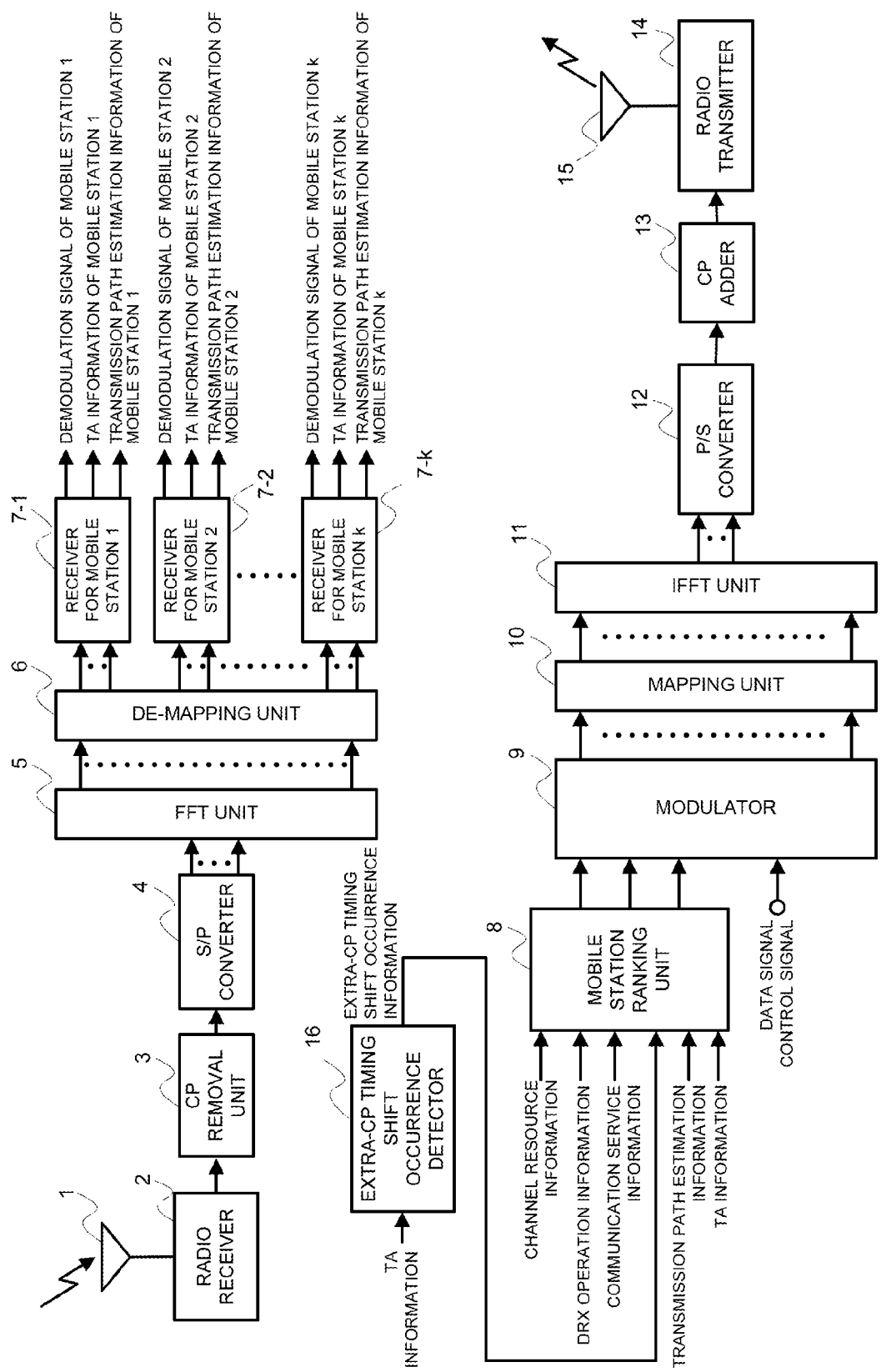
FIG. 1 is a view illustrating a configuration of a base station apparatus relating to the present invention.

DESCRIPTION OF NUMERALS 1 receiving antenna
2 radio receiver
3 and 101 CP removal units
4 and 102 S/P converter
5 and 103 FFT units
6 and 104 de-mapping units
7-1 to 7-k and 105-1 to 105-k receivers for mobile stations
8 mobile station ranking unit
9 and 201 modulators
10 ad 202 mapping units
11, 113, 115, and 203 IFFT units
12, 114, 116, and 204 P/S converters
13 and 205 CP adders
14 and 206 radio transmitters
15 and 207 transmitting antenna
21 mobile station information value calculating unit
22 memory unit
23 counter unit
24 timing detection signal transmission request mobile station ranking unit
25 timing detection signal transmission request mobile station determining unit
26 TA transmission mobile station ranking unit
27 TA transmission mobile station determining unit
31 TA information separator
106 reception filter
107 demodulator
108 inverse diffused signal generator
109 transmission path estimator
110 noise suppressor
111 weight calculating unit
112 equalization filter
117 delay profile generator
118 timing detector

BEST MODE FOR CARRYING OUT THE INVENTION

Hereinafter, characteristics of the present invention will be specifically stated by making a reference to the accompanied drawings for explanation thereof.

Embodiment 1

Next, the embodiment 1 of the present invention will be explained by making a reference to the accompanied drawings.

This embodiment is characterized in performing the timing update for the mobile stations including the mobile station performing the DRX operation, determining the mobile station for which the timing update is performed by employing the DRX operation information, and furthermore, performing the timing update by employing the extra-CP timing shift occurrence information, thereby to have the mobile stations having the extra-CP shift take precedence over the mobile stations having the intra-CP shift.

The radio communication system of the present invention includes the base station and a plurality of the mobile stations. FIG. 1 is a configuration view of the base station apparatus for performing the uplink timing control in the radio communication system in accordance with one embodiment of the present invention.

The base station apparatus of this embodiment is configured of a receiving antenna 1, a radio receiver 2, a CP removal unit 3, an S/P converter 4, an FFT unit 5, a de-mapping unit 6, k (k is integer equal to or more than 2) receivers 7-1 to 7-k for mobile stations, one for each mobile station, a mobile station ranking unit 8, a modulator 9, a mapping unit 10, an IFFT unit 11, a P/S converter 12, a CP adder 13, a radio transmitter 14, a transmitting antenna 15, and an extra-CP timing shift occurrence detector 16. And, the base station apparatus is characterized in including the mobile station ranking unit 8 for prioritizing each mobile station responding to a height of necessity for the timing update by employing received signal information of each mobile station, and information of each mobile station that the base station keeps.

At first, the radio receiver 2 of the base station performs the processes such as a reception power amplification, a down conversion, and an A/D conversion for a radio signal received by the receiving antenna 1, and outputs the signal for which the above processes have been executed to the CP removal unit 3.

The CP removal unit 3 has an output signal of the radio receiver 2 and an FFT reference timing as an input, and removes a portion of the received signal corresponding to the CP before receipt of the FFT timing.

The S/P converting unit 4 converts the received signal from which the CP has been removed from the serial signal to the parallel signal.

The FFT unit 5 collectively performs the fast-Fourier-transform operation for the received signals of all mobile stations converted to the parallel signal, thereby to perform a conversion from the time domain signal to the frequency domain signal.

The de-mapping unit 6 selects one part of sub-carriers, which is required for the receiving process for each mobile station, from the output signal of the FFT unit 3, converts a frequency of the carrier of each mobile station to a zero frequency, and makes an adjustment to a sampling frequency according to a transmission rate.

The receiver 7-k (1≦k≦K: K is an integer equal to or more than two) outputs by-mobile-station transmission path estimation information of the frequency domain, a modulated signal obtained by equalizing the received signal, and TA information. The TA information of each mobile station is generated based upon the reference signal of its own station, and a timing detection signal being transmitted from each mobile station, and the extra-CP timing shift is detected from this TA information by the extra-CP timing shift occurrence detector 16, and is outputted as extra-CP timing shift occurrence information. The timing detection signal is a signal from which the base station knows the transmission timing of the mobile station, and based upon this timing detection signal, the receiver 7 recognizes the transmission timings of the mobile stations, being locations of T1 and T2 shown in a direction orthogonal to that of a time axis of each mobile station, which is shown, for example, in an upper stage of FIG. 9, and generates the TA information by making a comparison with the reference signal (reference timing 0 of FIG. 9) of its own station.

The mobile station ranking unit 8 has communication service information, DRX operation information, and channel resource information as an input in addition to the above-mentioned transmission path estimation information, TA information, and extra-CP timing shift occurrence information, prioritizes the mobile stations in a descending order of necessity for the timing update, and outputs timing detection signal transmission request mobile station information indicative of the mobile station that is requested to transmit the timing detection signal, TA transmission mobile station information indicative of the mobile stations to which the TA is transmitted, and the TA information of the above mobile stations. These items of information are inputted into the modulator 9 together with the other data signals that are transmitted through the downlink, the control signal, and so on are subjected to the processes of the encoding, the interleave, and the modulation by the modulator 9, and outputted to the mapping unit 10. Additionally, the communication service information is information associated with the communication service that is performed by each mobile station, and is information that is notified by a high-rank layer. Further, the DRX operation information, which is information associated with a wake-up time and a sleep time of the mobile station performing the DRX operation, is outputted from a DRX controller (not shown in the figure) for determining lengths of the wake-up time and the sleep time, and a timing of transition to a wake-up status or a sleep status depending upon a data transmission frequency of each mobile station. In addition, the channel resource information, which is information including the information of the channel resource for transmitting the transmission timing detection signal coming from the mobile station through the up channel, and the information of the channel resource for transmitting the TA through the down channel, is outputted from a channel resource allocation scheduler (not shown in the figure) for determining which channel resource is allocated to which channel.

The mapping unit 10 maps the output signal of the modulator 9 on a frequency axis, and outputs it to the IFFT unit 11.

The IFFT unit 11 performs a conversion from the frequency domain signal to the time domain signal, and outputs it.

The P/S converter 12 P/S-converts the time domain signal for which the inverse-fast-Fourier-transform operation has been performed.

The CP adder 13 adds the CP to the P/S-converted signal, and outputs it.

The radio transmitter 14 performs the processes such as the D/A conversion, the up conversion, and the transmission power amplification for the above signal, and transmits the signal for which the above processes have been executed to the mobile station from the transmitting antenna 15.

Figure 2:
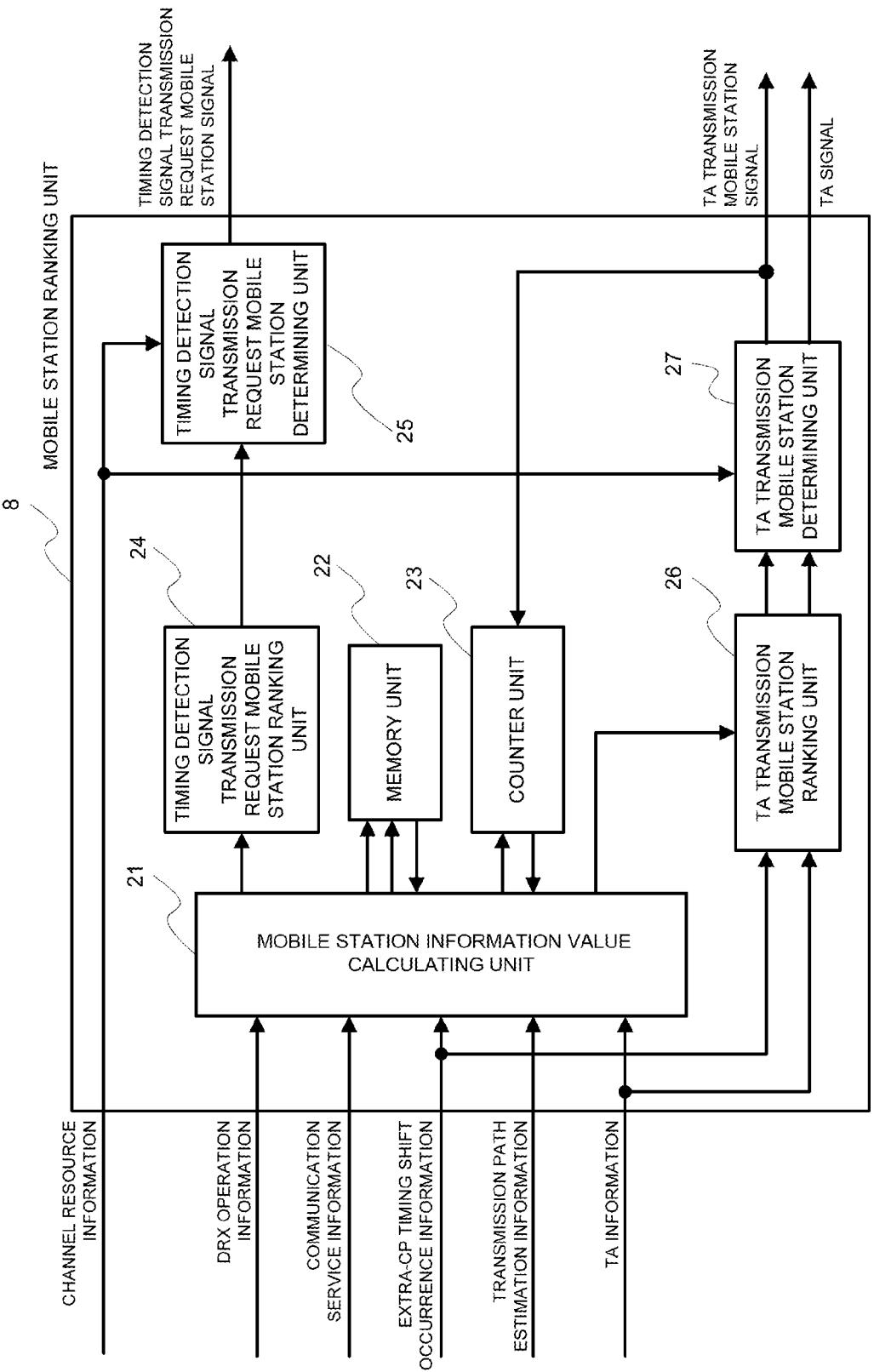
FIG. 2 is a view illustrating a detailed configuration of a mobile station ranking unit of an embodiment 1.

FIG. 2 is a view illustrating a detailed configuration of the mobile station ranking unit 8.

The mobile station ranking unit 8 is configured of a mobile station information value calculating unit 21, a memory unit 22, a counter unit 23, a timing detection signal transmission request mobile station ranking unit 24, a timing detection signal transmission request mobile station determining unit 25, a TA transmission mobile station ranking unit 26, and a TA transmission mobile station determining unit 27. And, the mobile station ranking unit 8 is characterized in prioritizing each mobile station in a descending order of a height of necessity for the timing update of each mobile station, and determining the mobile stations for which the timing update is performed in a descending order of the priority, to begin with the mobile station with a high priority order.

Into the mobile station information value calculating unit 21 are inputted the extra-CP timing shift occurrence information, the TA information, the transmission path estimation information, the DRX operation information, and the communication service information, respectively.

The mobile station information value calculating unit 21 numerically expresses the TA information, the transmission path estimation information, the DRX operation information, and the communication service information in order to calculate mobile station information value 1, which is explained below.

At first, the mobile station information value calculating unit 21 calculates a shift sample value of each mobile station from the TA information. Herein, a shift sample number is indicative of a difference between the reference timing and the transmission timing of each mobile station (the reception timing in the base station), and when the value of the shift sample number is negative (when the transmission timing shifts ahead of the reference timing), a value obtained by adding the sample number of a CP length to an absolute value of the above sample number is defined as the shift sample number. This is a process for evaluating an influence power of the shift in the negative direction similarly to that of the shift in the positive direction when the shift behind the reference timing is defined as a positive-direction shift.

For example, when the CP length is ten samples, and the reception timing shifts ahead of the reference timing by two samples, a difference between the reference timing and the above reception timing is −2 samples, whereby the shift sample number is 12 samples, being a sum of 2 samples that is an absolute value of −2, and 10 samples of the CP length. This makes it possible to apply evaluation criteria similar to that of the case of causing an extra-CP sample shift to occur behind the reference timing.

In addition, the mobile station information value calculating unit 21 calculates an extra-CP shift sample value with the case of the mobile station causing the extra-CP shift to occur, which is indicated by the extra-CP timing shift occurrence information. Specifically, the mobile station information value calculating unit 21 obtains an absolute value of the shift sample number when the reception timing shifts ahead of the reference timing, and obtains a value obtained by subtracting the CP length sample number from the shift sample number when the reception timing shifts behind the reference timing.

Next, the mobile station information value calculating unit 21 calculates a signal level value (signal power value) of each received signal by employing the transmission path estimation information of each mobile station. Additionally, the mobile station information value calculating unit 21 may be configured to obtain not the signal level value but a signal amplitude value.

The mobile station information value calculating unit 21 calculates a DRX remaining activation time of the mobile station performing the DRX operation, which ranges from the current time point during the wake-up time to the sleep time, from the DRX operation information.

And, depending upon an intensity of real-time performance of a communication service that each mobile station performs, the mobile station information value calculating unit 21 calculates real-time values that correspond to kinds of the above service on a one-to-one basis from the communication service information. For example, stronger real-time performance is required even though some errors are permissible with the case of voice communication, and strong real-time performance is not required so much in exchange for the fact that some errors alone is not permissible with the case of data communication. Thus, it can be safely said that the real-time performance of the voice communication is stronger than that of the data communication, and a voice-communication's request for establishing timing synchronization is higher than a data-communication's request. With this, it becomes possible to affix a priority degree based upon an intensity of the real-time performance by numerically expressing the value in the case of the voice communication, and the value in the case of the data communication as 2 and 1, respectively. Additionally, while the case of the voice communication and the data communication was listed as one example herein, needless to say, it is also possible to classify the service contents into more numerous kinds and to multi-value them at a plural of levels.

Figure 3:
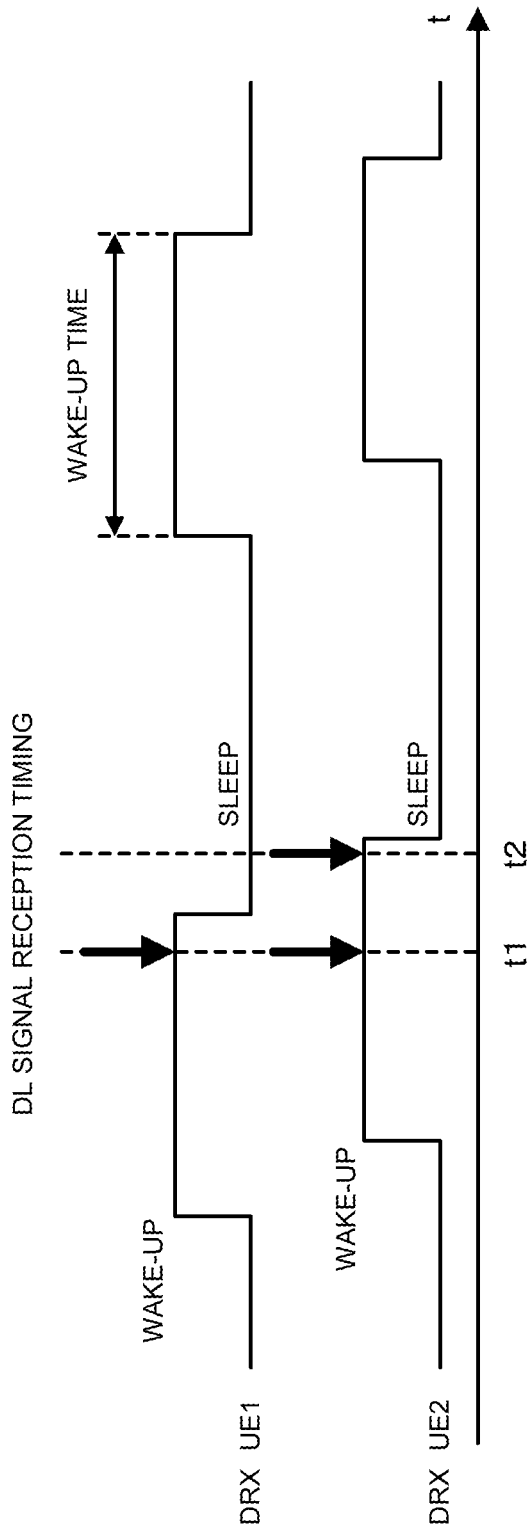
FIG. 3 is a view illustrating a DRX operation.

Herein, the DRX remaining activation time will be explained in details. FIG. 3 is a view illustrating an operation of the mobile station that performs the DRX operation. As shown in the figure, the mobile station, which performs the DRX operation, operates so as to repeat the wake-up time and the sleep time alternatively at a time interval determined by the base station. And, in the case of intending to transmit the TA to the DRX mobile stations during the wake-up time thereof (t=t1 in the figure), the TA transmission is impossible at the next DL (Downlink) signal reception timing (t=t2 in the figure) with regard to DRX UE1 because the next DL signal reception timing falls within the sleep-time, and contrary to it, the transmission is possible also at the next DL signal reception timing with regard to DRX2, whereby it can be said that necessity for transmitting the TA to DRX1 is higher at the current time point, and a priority degree of the DRX1 needs to be raised. Additionally, while attention was paid to the DRX remaining activation time herein, for example, the method may be adopted of having the mobile stations, of which the number of times at which the DL signal including the TA is received is few, take precedence. Further, the mobile station that performs the operation of receiving the downlink signal without performing the DRX operation can be handled similarly to the DRX mobile station by setting the longest wake-up time, out of the wake-up times of the DRX mobile station.

The mobile station information value calculating unit 21 obtains the mobile station information value 1 by employing the above-described shift sample value, signal level value, DRX remaining activation time, real-time value, and extra-CP shift sample value as an index for ranking the mobile stations to which the TA is transmitted.

At first, the mobile station information value calculating unit 21 calculates the mobile station information value 1 for the mobile stations causing the intra-CP shift to occur according to the following Numerical equation 1.

Mobile station information value 1=(shift sample value×signal level value×real-time value)/DRX remaining activation time  [Numerical equation 1]

What the Numerical equation 1 signifies is that each of the mobile station of which the timing shift is large, the mobile station of which the received signal level is large, the mobile station performing the service of which the real-time performance is strong, and the mobile station of which the DRX remaining activation time is short is a mobile station with high necessity for the timing update.

Next, the mobile station information value calculating unit 21 calculates the mobile station information value 1 for the mobile station causing the extra-CP shift to occur according to the following Numerical equation 2. The following Numerical equation 2 is indicative of an interference signal level in the case that the extra-CP shift occurs.

Mobile station information value 1=extra-CP shift sample value×signal level value.  [Numerical equation 2]

Herein, the reason why the mobile station information value 1 is obtained with the interference signal level will be explained. When the extras-CP timing shift occurs, the interference occurs in the received signal of the base station, and resultantly, the above interference exerts an influence upon the received signals of the other mobile stations. Therefore, under necessity for urgently removing such an influence, the mobile stations are prioritized with the interference signal level value that is calculated by multiplying the extra-CP shift sample value by the signal level value irrespectively of strength or weakness of the real-time performance of the signal transmitted by the mobile station, and the DRX remaining activation time.

The mobile station information value 1, being an output of the mobile station information value calculating unit 21, is outputted to the TA transmission mobile station ranking unit 26, is furthermore outputted to the memory unit 22, and is kept for a constant time.

However, the mobile station information value 1 of the mobile station causing the extra-CP shift to occur cannot be handled similarly to that of the mobile station causing the intra-CP shift to occur because the former is obtained with the interference signal level. For this, performing the following process for the mobile station information value 1 of the mobile station causing the extra-CP shift to occur, which is outputted to the memory unit 22, allows the mobile station information values 1 of all mobile stations to be handled similarly.

The mobile station information value 1 of the mobile station causing the extra-CP shift to occur, which is inputted into the memory unit 22, needs to be tinged with information saying that necessity for the timing update is high due to the occurrence of the interference on top of calculating it by employing the Numerical equation 1 similarly to that of the mobile station causing the intra-CP shift to occur. For this, the mobile station information value 1 of the mobile station causing the extra-CP shift to occur is calculated by setting the real-time value to a maximum value of the set numerical value within the expected service, and the DRX remaining activation time to a minimum value of the set numerical value in the Numerical equation 1, respectively.

For example, when it is assumed that the maximum value of the real-time value is 2 with the case of the voice communication service, 2 is set herein. And, when the minimum value of the DRX remaining activation time is 1 µs, the set value is defined as 1 µs. This allows the mobile station information values 1 of all mobile stations to be handled similarly on top of taking occurrence of the extra-CP shift into consideration. Additionally, while the mobile station information values 1 that was outputted to the memory unit 22 was calculated herein by performing the special process as mentioned above with regard to the mobile station causing the extra-CP shift to occur, a configuration may be made of employing the numerical equation 1 as it stands without performing such a process, thereby to calculate the mobile station information values 1. In addition, the mobile station information value calculating unit 21 calculates mobile station information values 2 with Numerical equation 3 in order to output it to the timing detection signal transmission request mobile station ranking unit 24.

$$\text{Mobile station information value 2} = (\text{past mobile station information value 1} \times \text{elapsed time since past TA transmission})/\text{DRX remaining activation time}$$ [Numerical equation 3]

Herein, the past mobile station information value 1 is mobile station information value 1 of each mobile station at the time of the past TA transmission, which has been stored in the memory unit 22, and the elapsed time since the past TA transmission is a time calculated by the counter unit 23 for each mobile station. Additionally, the past mobile station information value 1 and the elapsed time since the past TA transmission do not exist in the mobile station to which the TA has never been transmitted, and in the mobile station that has never been requested to transmit the reference signal, and thus, the Numerical equation 3 cannot be employed. However, the correspondence to the elapsed time since the past TA transmission is enabled by defining the elapsed time since commencement of activation of the base station as the elapsed time since the past TA transmission. In addition, there is no information for judging necessity for the timing update for the mobile station in which no past mobile station information value 1 exists, and necessity for requesting the above mobile station to transmit the reference signal is preferredly higher than necessity for requesting the mobile stations having already transmitted the reference signal to do so, whereby the correspondence to the elapsed time since the past TA transmission is enabled by setting the past mobile station information value 1 of the above mobile stations to the maximum value of the mobile station information value 1 stored within the memory unit 22.

The mobile station information value 2 calculated with the above-mentioned Numerical equation 3 is transmitted to the timing detection signal transmission request mobile station ranking unit 24.

According to the mobile station information value 2, being an output from the mobile station information value calculating unit 21, the timing detection signal transmission request mobile station ranking unit 24 performs a ranking process of permuting the mobile stations in a descending order of magnitude of the above value, and outputs a ranking result thereof to the timing detection signal transmission request mobile station determining unit 25.

The timing detection signal transmission request mobile station determining unit 25, according to the uplink channel resource information out of the channel resource information, determines the mobile stations that are requested to transmit the timing detection signal in a descending order of the ranking result, to begin with the mobile station with a high rank, by the number equivalent to the mobile stations that can transmit the timing detection signal through the uplink, and outputs the above information. That is, the timing detection signal transmission request mobile station determining unit 25 allocates the uplink channel resources for transmitting the timing detection signal to the determined mobile stations. The mobile station transmits the transmission timing detection signal, which the base station uses in order to detect the transmission timing of its own station, to the base station by employing the allocated channel resource.

On the other hand, the TA transmission mobile station ranking unit 26, according to the mobile station information value 1 outputted from the mobile station information value calculating unit 21, performs the ranking process of permuting the mobile stations in a descending order of magnitude of the above value, and outputs a ranking result thereof to the TA transmission mobile station determining unit 27.

Herein, when the mobile station causing the extra-CP timing shift to occur exists, judging from the extra-CP timing shift occurrence information that is inputted into the TA transmission mobile station ranking unit 26, the TA transmission mobile station ranking unit 26 performs the permuting process so that the mobile stations causing the extra-CP timing shift to occur take precedence over the mobile stations causing the intra-CP timing shift to occur.

Specifically, the TA transmission mobile station ranking unit 26 divides the mobile station information values 1 of each mobile station being outputted from the mobile station information value calculating unit 21 into that of a group of the mobile stations causing the extra-CP timing shift to occur and that of group of the mobile stations causing the intra-CP timing shift to occur, and performs the ranking process of permuting the mobile stations in a descending order of magnitude of the mobile station information value 1 within each group. And, the TA transmission mobile station ranking unit 26 obtains a ranking result of all mobile stations by adding a ranking result of the mobile station group causing the intra-CP timing shift to occur to the end of a ranking result of the mobile station group causing the extra-CP timing shift to occur. With this, the timing update of the mobile stations causing the extra-CP timing shift to occur can preferredly be performed.

And, the TA transmission mobile station determining unit 27, according to the downlink channel resource information out of the channel resource information, determines the mobile stations to which the TA information is transmitted in a descending order of the ranking result, to begin with the mobile station with a high rank, by the number equivalent to the mobile stations to which the TA can be transmitted through the downlink, and outputs TA transmission mobile station information indicative of the above mobile stations and the TA information. That is, the TA transmission mobile station determining unit 27 allocates the downlink channel resource through which the TA information is transmitted to the determined mobile stations. Simultaneously therewith, according to the TA transmission mobile station information, the counter value of the elapsed time of the mobile station to which the TA is transmitted in the counter unit 23 is reset. The mobile station adjusts the timing signal of its own station based upon the TA information that is transmitted by employing the channel resource allocated herein.

An operation of the mobile station ranking unit 8 will be explained briefly.

Into the mobile station information value calculating unit 21 are inputted the extra-CP timing shift occurrence information, the TA information, the transmission path estimation information, the DRX operation information, and the communication service information, respectively.

The mobile station information value calculating unit 21 numerically expresses the TA information, the transmission path estimation information, the DRX operation information, and the communication service information in order to calculate the above-described mobile station information value 1. At first, the mobile station information value calculating unit 21 calculates the shift sample value of each mobile station from the TA information.

Next, the mobile station information value calculating unit 21 calculates the signal level value (signal power value) of each received signal by employing the transmission path estimation information of each mobile station. Additionally, as described above, not the signal level value, but the signal amplitude value may be obtained.

Continuously, the mobile station information value calculating unit 21 calculates the DRX remaining activation time of the mobile station performing the DRX operation, which ranges from the current time point during the wake-up time to the sleep time, from the DRX operation information.

And, the mobile station information value calculating unit 21 calculates the real-time value of each mobile station from the communication service information.

And, the mobile station information value calculating unit 21 obtains the mobile station information value 1 by employing the above-described shift sample value, signal level value, DRX remaining activation time, real-time value, and extra-CP shift sample value as an index for ranking the mobile stations to which the TA is transmitted, and calculates the mobile station information value 1 of the mobile station causing the extra-CP timing shift to occur.

The mobile station information value 1 calculated by the mobile station information value calculating unit 21 is outputted to the TA transmission mobile station ranking unit 26, is furthermore outputted to the memory unit 22, and is kept for a constant time.

The mobile station information value 1 of the mobile station causing the extra-CP shift to occur is calculated by setting the real-time value to a maximum value of the set numerical value within the expected service, and the DRX remaining activation time to a minimum value of the set numerical value in the Numerical equation 1, respectively. Additionally, while the mobile station information value 1 that was outputted to the memory unit 22 was calculated herein by performing the special process as mentioned above with regard to the mobile station causing the extra-CP shift to occur, the mobile station information value 1 may be calculated by employing the Numerical equation 1 as it stands without performing such a process.

The mobile station information value calculating unit 21 calculates the mobile station information value 2 with the Numerical equation 3 in order to output it to the timing detection signal transmission request mobile station ranking unit 24, and the mobile station information value 2 is transmitted to the timing detection signal transmission request mobile station ranking unit 24.

According to the mobile station information value 2, being an output from the mobile station information value calculating unit 21, the timing detection signal transmission request mobile station ranking unit 24 performs a ranking process of permuting the mobile stations in a descending order of magnitude of the above value, and outputs a ranking result thereof to the timing detection signal transmission request mobile station determining unit 25.

The timing detection signal transmission request mobile station determining unit 25, according to the uplink channel resource information out of the channel resource information, determines the mobile stations that are requested to transmit the timing detection signal in a descending order of the ranking result, to begin with the mobile station with a high rank, by the number equivalent to the mobile stations that can transmit the timing detection signal through the uplink, and outputs the above information. The mobile station transmits the transmission timing detection signal, which the base station uses in order to detect the transmission timing of its own station, to the base station by employing the allocated channel resource.

On the other hand, the TA transmission mobile station ranking unit 26, according to the mobile station information value 1 outputted from the mobile station information value calculating unit 21, performs the ranking process of permuting the mobile stations in a descending order of magnitude of the above value, and outputs a ranking result thereof to the TA transmission mobile station deciding unit 27.

Herein, when the mobile station causing the extra-CP timing shift to occur exists, judging from the extra-CP timing shift occurrence information that is inputted into the TA transmission mobile station ranking unit 26, the TA transmission mobile station ranking unit 26 performs the permuting process so that the mobile stations causing the extra-CP timing shift to occur take precedence over the mobile stations causing the intra-CP timing shift to occur.

And, the TA transmission mobile station deciding unit 27, according to the downlink channel resource information out of the channel resource information, determines the mobile stations to which the TA information is transmitted in a descending order of the ranking result, to begin with the mobile station with a high rank, by the number equivalent to the mobile stations to which the TA can be transmitted through the downlink, and outputs the TA transmission mobile station information indicative of the above mobile stations and the TA information. Continuously, according to the TA transmission mobile station information being outputted, the counter value of the elapsed time of the mobile station to which the TA is transmitted in the counter unit 23 is reset. The mobile station adjusts the timing signal of its own station based upon the TA information being transmitted by employing the channel resource allocated herein.

In such a manner, in this embodiment, performing the timing update by employing the DRX operation information makes it possible to perform the timing update for the mobile stations including the mobile station performing the DRX operation. Further, transmitting the TA to the mobile stations by having the mobile stations causing the extra-CP shift to occur take precedence over the mobile stations causing the intra-CP shift to occur, thereby to prioritizing the mobile stations makes it possible to suppress occurrence of the interference in the base station. In addition, the effective timing update can be performed when the number of the mobile stations to which the TA can be transmitted through the downlink is smaller than that of the mobile stations having transmitted the reference signal through the uplink because the TA can be transmitted to the mobile stations, in a descending order of necessity for the TA transmission, to begin with the mobile station with higher necessity.

And, by employing the timing shift of each mobile station, the signal level, the real-time performance of the communication service, the DRX remaining activation time, and the elapsed time since the past TA transmission, it was made a rule to request the mobile station with high necessity for the timing update to transmit the timing detection signal. With this, the efficient timing control can be taken depending upon a degree of necessity for the timing update of each mobile station.

Additionally, while each mobile station was prioritized by employing the extra-CP timing shift occurrence information, the TA information, the information associated with the transmission timing of the mobile station such as the past TA transmission information, the transmission path estimation information, the communication service information, and the communication information of the mobile station such as the DRX operation information in this embodiment, each mobile station can be also prioritized by employing at least one of these items of the information.

Embodiment 2

Figure 4:
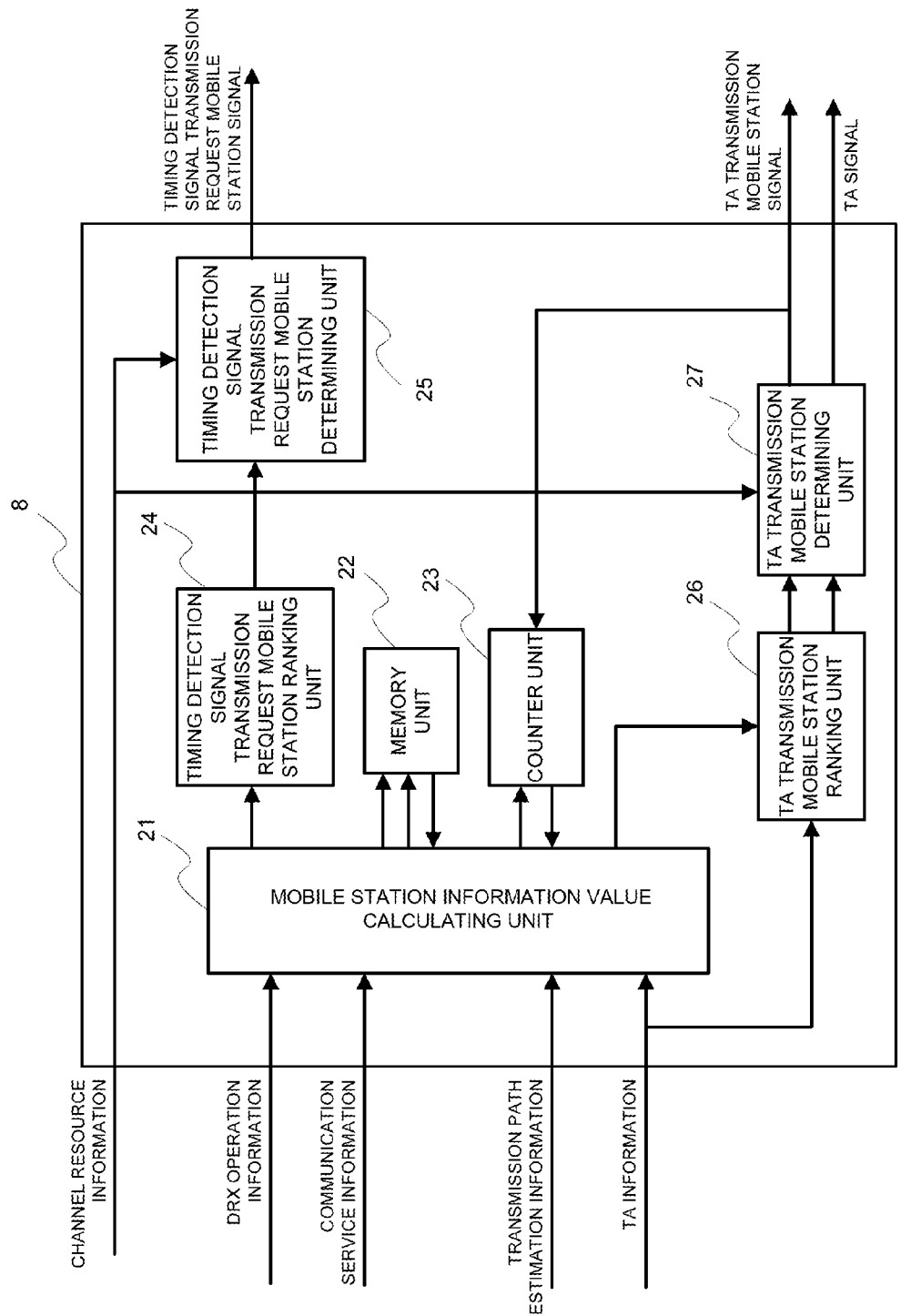
FIG. 4 is a view illustrating a detailed configuration of the mobile station ranking unit of an embodiment 2.

FIG. 4 is a view illustrating a detailed configuration of a mobile station ranking unit 8 of the embodiment 2, and this mobile station ranking unit 8 assumes a configuration in which no extra-CP timing shift occurrence information is inputted. Additionally, the components other than it are similar to that of the embodiment 1 already explained, so identical codes are affixed thereto, its explanation is omitted, and a configuration and an operation different from that of embodiment 1 will be explained herein.

This embodiment is characterized in prioritizing each of the mobile stations based upon the output of the mobile station information value calculating unit 21 without performing the process of specially having the mobile stations causing the extra-CP timing shift to occur take precedence, and determining the mobile stations, which are requested to transmit the timing detection signal, and the mobile stations, to which the TA is transmitted.

The mobile station information value calculating unit 21 shown in the foregoing embodiment 1 calculates the mobile station information value 1 of each mobile station according to the Numerical equation 1 without performing the special process because no extra-CP timing shift occurrence information is inputted, and the above mobile station information value 1 is inputted into the memory unit 22, and simultaneously therewith, is inputted into the TA transmission mobile station ranking unit 26 as well.

An operation of determining the mobile stations to which the TA is transmitted after it, and furthermore, an operation of determining the mobile stations which are requested to transmit the timing detection signal are similar to that of the case of the foregoing embodiment 1.

In such a manner, in this embodiment, the mobile stations are prioritized according to the mobile station information value 1 of each mobile station irrespective of presence or absence of the mobile station causing the extra-CP timing shift to occur, and the mobile stations which are requested to transmit the timing detection signal, and the mobile stations to which the TA is transmitted are determined. In this embodiment, the effective timing control can be performed when the number of the mobile stations to which the TA can be transmitted through the downlink is smaller than that of the mobile stations having transmitted the reference signal through the uplink because the TA can be transmitted to the mobile stations in a descending order of necessity for the TA transmission, to begin with the mobile station with higher necessity.

Embodiment 3

Figure 5:
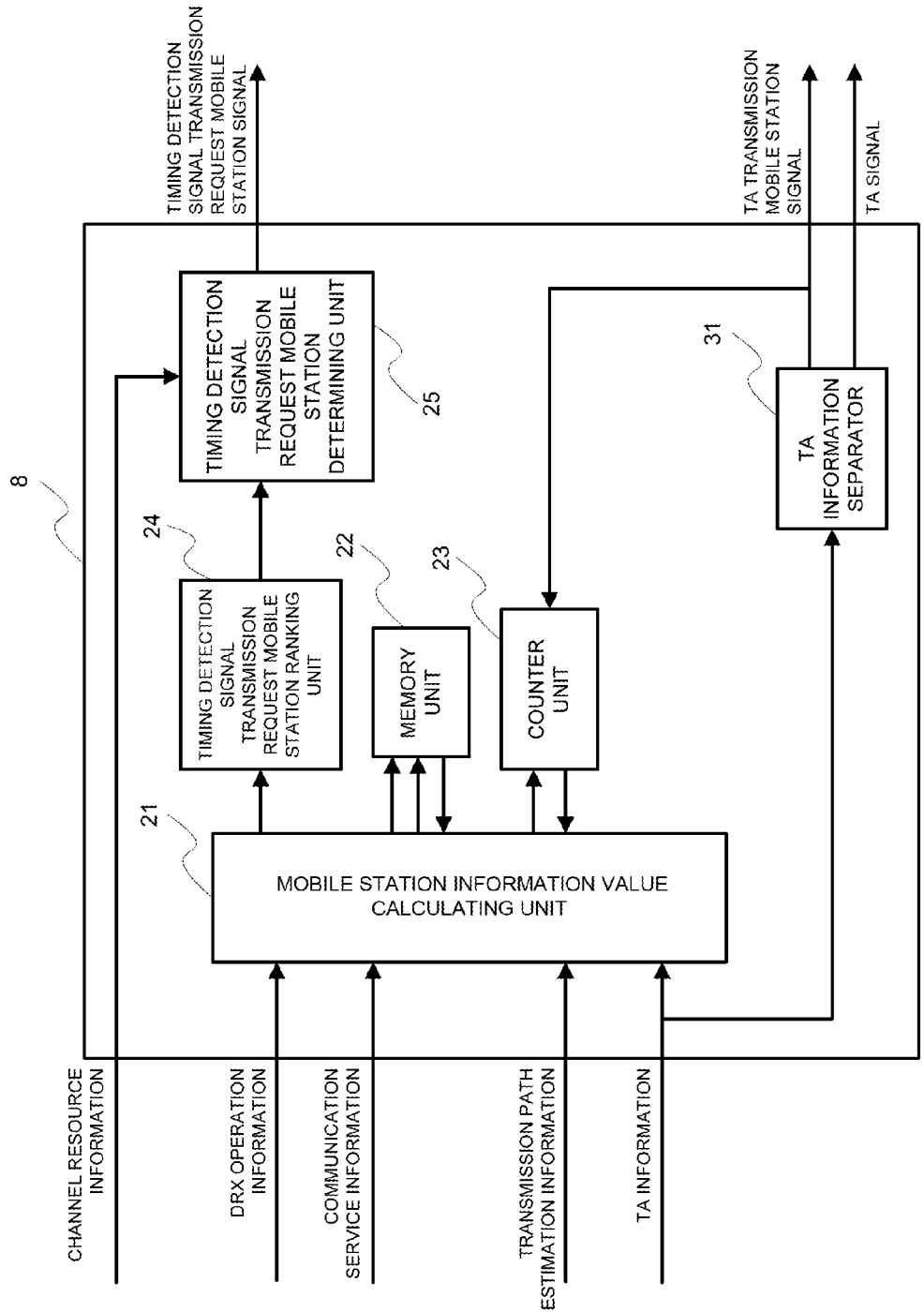
FIG. 5 is a view illustrating a detailed configuration of the mobile station ranking unit of an embodiment 3.
Figure 6:
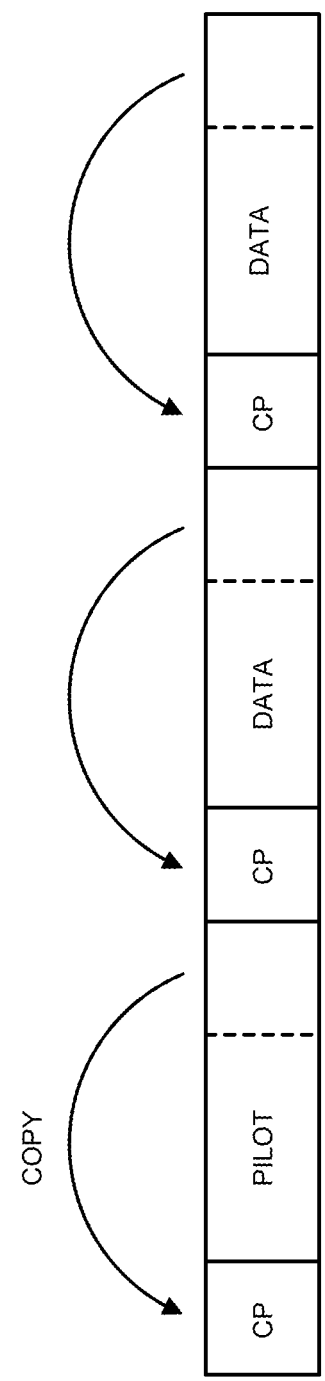
FIG. 6 is a view illustrating a format of a packet signal.
Figure 7:
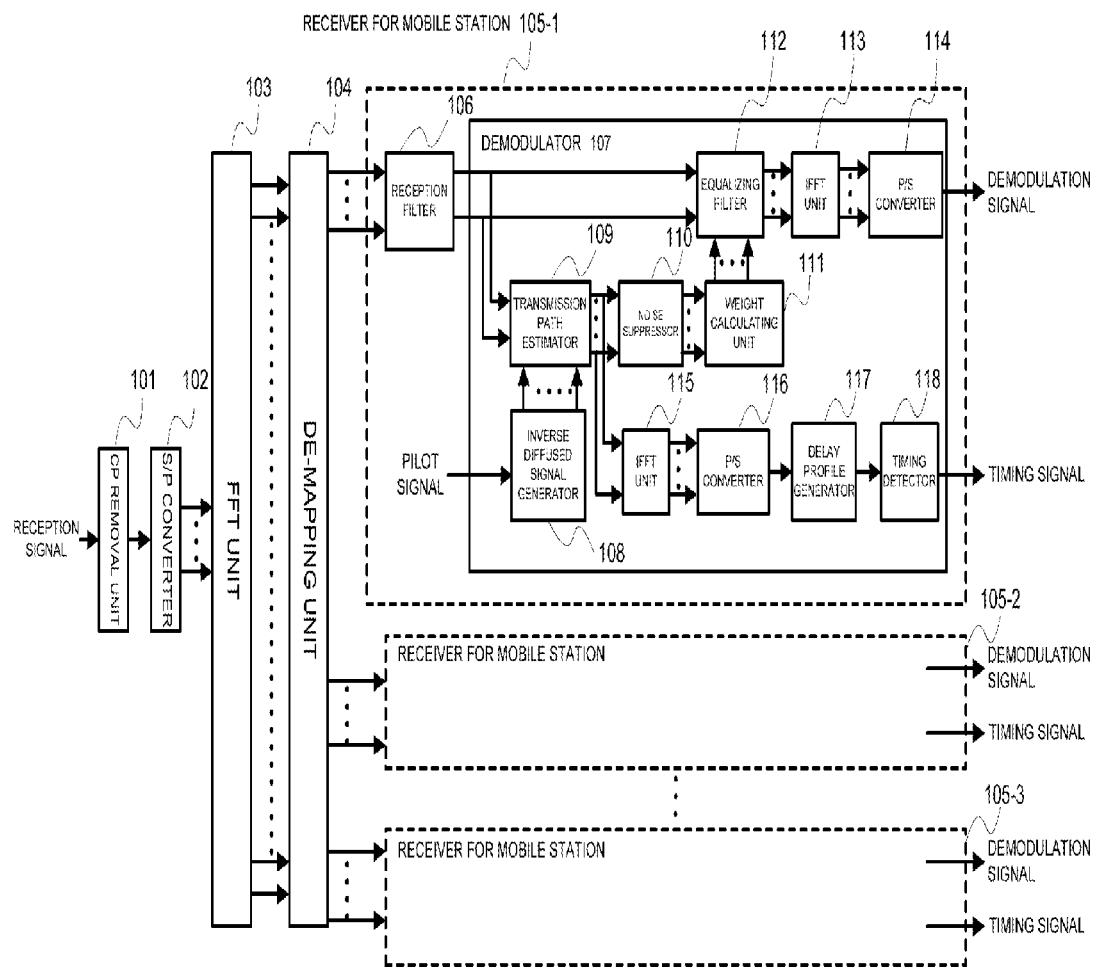
FIG. 7 is a view illustrating a block diagram of a receiving apparatus.
Figure 8:
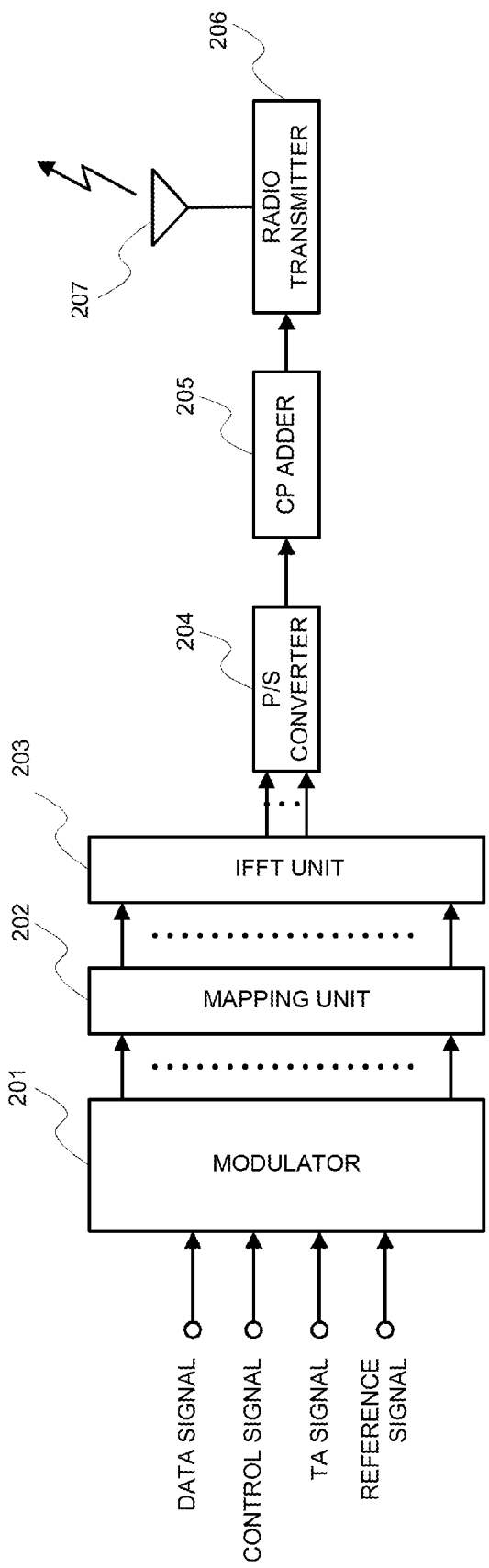
FIG. 8 is a view illustrating a block diagram of a transmitting apparatus.

FIG. 5 is a view illustrating a detailed configuration of a mobile station ranking unit 8 of the embodiment 3, and this mobile station ranking unit 8 assumes a configuration in which the TA transmission mobile station ranking unit 26 and the TA transmission mobile station deciding unit 27 do not exist. Additionally, the components other than it are similar to that of the embodiment 1 already explained, so identical codes are affixed thereto, its explanation is omitted, and a configuration and an operation different from that of embodiment 1 will be explained herein.

This embodiment is characterized in that a TA information separator 31 performs a process of outputting a TA transmission mobile station signal and the TA signal from the TA information being inputted, and a mobile station ranking process for determining the mobile stations that are requested to transmit the timing detection signal without performing the mobile station ranking process for determining the mobile stations to which the TA is transmitted.

It is thought that the number of the mobile stations, which are requested to transmit the reception timing detection signal, and the number of the mobile stations, to which the TA is transmitted, being attended with it, coincide with each other because, as rule, the mobile station is requested to transmit the reception timing detection signal on the assumption that the TA is transmitted to the mobile station. For this, the process of determining the mobile stations to which the TA is transmitted becomes useless, and the TA can be transmitted to the mobile stations having transmitted the reception timing detection signal without fail by performing the prioritizing process for the mobile stations that are requested to transmit the reception timing detection signal.

In such a manner, in this embodiment, transmitting the TA to the mobile stations having transmitted the reception timing detection signal makes it possible to realize the simplified configuration in which the process of ranking the mobile stations to which the TA is transmitted becomes useless, and on the other hand, prioritizing the mobile stations, which are requested to transmit the reception timing detection signal, makes it possible to transmit the TA to the mobile stations in a descending order of necessity for the TA transmission, to begin with the mobile station with higher necessity, and to perform the effective timing control.

Herein, how the TA is transmitted to the TA transmission mobile station determined by the operations shown in the embodiments 1 to 3 will be explained below.

There is no necessity for performing the timing update for the mobile station scheduled with the uplink at a minimum updatable interval at the time of performing the timing update (herein, the so-called minimum updatable interval depends upon a transmittable interval of the reference signal for detecting the timing).

The reason is that it is when a distance with the base station fluctuates due to the travelling mobile station that necessity for the timing update is aroused; however, the timing shift that occurs for one second is 0.324 μs, and is small to the extent that almost no influence upon a reception feature exists, for example, upon thinking of the mobile station that moves at a high speed of 350 km/h in a vertical direction from the base station, and furthermore, several seconds to ten and several seconds are enough for the interval of the timing update for the mobile station that moves at a middle or low speed (60 km/h or less). Further, so as to enable an operation of follow-up to a drastic fluctuation in the transmission path, which is called a corner effect, the update interval of several hundreds ms or so is required. Thus, it is possible to perform the timing update for the mobile station not scheduled with the uplink at an interval of the timing update for the mobile station scheduled with the uplink.

Additionally, while the foregoing terminal of the present invention can be configured with hardware as can be seen from the above explanation, it can be also realized with a computer program.

A function and an operation similar to that of the foregoing embodiments are realized by a processor that operates under a program stored in a program memory. Additionally, it is also possible to realize a function of one part of the foregoing embodiments with the computer program.

Above, while the embodiments relating to the present invention was explained, the present invention is applicable to the communication technique other than the SC-FDMA technique.

The invention claimed is:
1. A radio communication system, comprising:
a calculator that calculates an index for determining a priority order for controlling a transmission timing based upon timing information associated with a timing at which a signal is transmitted from each mobile station to a base station, or communication information associated with communication of each mobile station;

a priority order determining unit that determines the priority order based upon said calculated index; and an allocating unit that allocates channel resources for communicating information, which is employed at the moment of modifying a shift of said transmission timing, to the mobile stations in a descending order of the priority, to begin with the mobile station of which said determined priority order is high, wherein said calculator calculates the index based upon at least one of extra-Cyclic-Prefix timing shift occurrence information indicative of existence of the mobile station being in a situation of a transmission timing causing interference to occur in a signal transmitted to the base station, Discontinuous Reception (DRX) operation information indicative of lengths of a wake-up time and a sleep time of the mobile station that repeats an activation status and a sleep status, and of a timing of transition to each status, Timing Advance (TA) information indicative of a shift of the transmission timing, transmission path estimation information associated with a transmission path of each mobile station, communication service information indicative of kinds of communication services of each mobile station, and an elapsed time since modification of the transmission timing shift performed in the past, and wherein said calculator calculates the index that is in proportion to a timing shift sample value being obtained from the TA information, a signal level value being obtained from the transmission path estimation information, a real-time value being obtained from the communication service information, and the elapsed time, and is in inverse proportion to a DRX remaining activation time being obtained from the Discontinuous Reception operation information.

2. A radio communication system according to claim 1, wherein said allocating unit allocates an uplink channel resource for transmitting a timing detection signal for detecting the transmission timing of the mobile station.

3. A radio communication system according to claim 1, wherein said allocating unit allocates a downlink channel resource for transmitting Timing Advance information, being information associated with a shift of the transmission timing of the mobile station, through a downlink.

4. A radio communication system according to claim 1, comprising the mobile station that modifies the shift of the transmission timing based upon the Timing Advance information, being information associated with the shift of the transmission timing of the mobile station, said Timing Advance information being transmitted by employing said allocated channel resource.

5. A radio communication system, comprising:
a calculator that calculates an index for determining a priority order for controlling a transmission timing based upon timing information associated with a timing at which a signal is transmitted from each mobile station to a base station, or communication information associated with communication of each mobile station;

a priority order determining unit that determines the priority order based upon said calculated index; and an allocating unit that allocates channel resources for communicating information, which is employed at the moment of modifying a shift of said transmission timing, to the mobile stations in a descending order of the priority, to begin with the mobile station of which said determined priority order is high, wherein said allocating unit allocates a downlink channel resource for transmitting Timing Advance information, being information associated with a shift of the transmission timing of the mobile station, through a downlink, and wherein, when the mobile stations causing an extra-Cyclic-Prefix timing shift to occur exist, which is made clear from the extra-Cyclic-Prefix timing shift occurrence information, said priority order determining unit separately executes permutation of the mobile stations that cause an extra-Cyclic-Prefix timing shift to occur, and permutation of the mobile stations that do not cause the extra-Cyclic-Prefix timing shift to occur, and executes permutation of the mobile stations that do not cause the extra-Cyclic-Prefix timing shift to occur after permuting the mobile stations that cause an extra-Cyclic-Prefix timing shift to occur.

6. A radio communication system according to claim 5, wherein said allocating unit allocates an uplink channel resource for transmitting a timing detection signal for detecting the transmission timing of the mobile station.

7. A radio communication system according to claim 5, comprising the mobile station that modifies the shift of the transmission timing based upon the Timing Advance information, being information associated with the shift of the transmission timing of the mobile station, said Timing Advance information being transmitted by employing said allocated channel resource.

8. A timing control determining method, performed by a base station, comprising:
calculating, by the base station, an index for determining a priority order for controlling a transmission timing based upon timing information associated with a timing at which a signal is transmitted from each mobile station to a base station, or communication information associated with communication of each mobile station;

determining, by the base station, the priority order based upon said calculated index; and allocating, by the base station, channel resources for communicating information, which is employed at the moment of modifying a shift of said transmission timing, to the mobile stations in a descending order of the priority, to begin with the mobile station of which said determined priority order is high, wherein said calculating calculates the index based upon at least one of extra-Cyclic-Prefix timing shift occurrence information indicative of existence of the mobile station being in a situation of a transmission timing causing interference to occur in a signal transmitted to the base station, Discontinuous Reception (DRX) operation information indicative of lengths of a wake-up time and a sleep time of the mobile station that repeats an activation status and a sleep status, and of a timing of transition to each status, Timing Advance (TA) information indicative of a shift of the transmission timing, transmission path estimation information associated with a transmission path of each mobile station, communication service information indicative of kinds of communication services of each mobile station, and an elapsed time since modification of the transmission timing shift performed in the past, wherein said calculating calculates the index that is in proportion to a timing shift sample value being obtained from the TA information, a signal level value being obtained from the transmission path estimation information, a real-time value being obtained from the communication service information, and the elapsed time, and is in inverse proportion to a DRX remaining activation time being obtained from the Discontinuous Reception operation information.

9. A timing control determining method according to claim 8, wherein said allocating allocates an uplink channel resource for transmitting a timing detection signal for detecting the transmission timing of the mobile station.

10. A timing control determining method according to claim 8, wherein said allocating allocates a downlink channel resource for transmitting Timing Advance information, being information associated with a shift of the transmission timing of the mobile station, through a downlink.

11. A timing control determining method according to claim 8, comprising modifying the shift of the transmission timing based upon the Timing Advance information, being information associated with the shift of the transmission timing of the mobile station, said Timing Advance information being transmitted by employing said allocated channel resource.

12. A timing control determining method, performed by a base station, comprising:
 calculating, by the base station, an index for determining a priority order for controlling a transmission timing based upon timing information associated with a timing at which a signal is transmitted from each mobile station to a base station, or communication information associated with communication of each mobile station;
 determining, by the base station, the priority order based upon said calculated index; and
 allocating, by the base station, channel resources for communicating information, which is employed at the moment of modifying a shift of said transmission timing, to the mobile stations in a descending order of the priority, to begin with the mobile station of which said determined priority order is high,
 wherein said allocating allocates a downlink channel resource for transmitting Timing Advance information, being information associated with a shift of the transmission timing of the mobile station, through a downlink, and
 wherein, when the mobile stations causing an extra-Cyclic-Prefix timing shift to occur exist, which is made clear from the extra-Cyclic-Prefix timing shift occurrence information, said determining separately executes permutation of the mobile stations that cause an extra-Cyclic-Prefix timing shift to occur, and permutation of the mobile stations that do not cause the extra-Cyclic-Prefix timing shift to occur, and executes permutation of the mobile stations that do not cause the extra-Cyclic-Prefix timing shift to occur after permuting the mobile stations that cause an extra-Cyclic-Prefix timing shift to occur.

13. A timing control determining method according to claim 12, wherein said allocating allocates an uplink channel resource for transmitting a timing detection signal for detecting the transmission timing of the mobile station.

14. A timing control determining method according to claim 12, comprising modifying the shift of the transmission timing based upon the Timing Advance information, being information associated with the shift of the transmission timing of the mobile station, said Timing Advance information being transmitted by employing said allocated channel resource.

* * * * *